United States Patent
Yasumuro et al.

(10) Patent No.: US 10,719,904 B2
(45) Date of Patent: Jul. 21, 2020

(54) PARALLEL PROCESSING APPARATUS AND PARALLEL PROCESSING METHOD

(71) Applicant: FUJITSU LIMITED, Kawasaki-shi, Kanagawa (JP)

(72) Inventors: Taketoshi Yasumuro, Kawasaki (JP); Hirotaka Fukushima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/043,978

(22) Filed: Jul. 24, 2018

(65) Prior Publication Data

US 2019/0043157 A1    Feb. 7, 2019

(30) Foreign Application Priority Data

Aug. 1, 2017   (JP) ................. 2017-149087

(51) Int. Cl.
  *G06T 1/20*      (2006.01)
  *G06F 9/38*      (2018.01)

(52) U.S. Cl.
  CPC . *G06T 1/20* (2013.01); *G06F 9/38* (2013.01)

(58) Field of Classification Search
  CPC ...................................................... G06T 1/20
  USPC ....................................................... 345/505
  See application file for complete search history.

(56) References Cited

U.S. PATENT DOCUMENTS 7,571,342 B2 *  8/2009  Tanaka .................. G06F 1/04
                                                     713/600
2001/0014888 A1 *  8/2001  Tsuchida ........... G06F 16/24532

FOREIGN PATENT DOCUMENTS

JP     2010-277579    * 12/2010    ............... G06F 9/50
JP     2010-277579 A    12/2010
JP     2013-140490 A    7/2013

* cited by examiner

*Primary Examiner* — Hai Tao Sun
(74) *Attorney, Agent, or Firm* — Fujitsu Patent Center

(57) ABSTRACT

A parallel processing apparatus includes, a plurality of operational circuits that execute operations for data in parallel, and a control circuit that, upon an end of operations for a first portion of the data, finds estimated operation time for operations for a second portion that is an object of operations subsequent to the first portion, based on target time for operational processing for the data and a data amount of remaining data for which no operation has been executed in the data, finds a second parallelism of the operations for the second portion, based on a first parallelism of the operations for the first portion, a measurement value of operation time for the operations for the first portion, and the estimated operation time, and causes operational circuits, numbering in a number indicated by the second parallelism among the plurality of operational circuits, to execute the operations for the second portion.

12 Claims, 14 Drawing Sheets

| PARALLELISM | POWER (W) | PERFORMANCE | PERFORMANCE/ POWER | PROCESSING TIME (h) | ELECTRIC ENERGY (Wh) |
|---|---|---|---|---|---|
| 1 | 1.0 | 1.0 | 1.0 | 100.0 | 100.0 |
| 2 | 2.0 | 1.8 | 0.9 | 55.6 | 111.1 |
| 4 | 4.0 | 3.2 | 0.8 | 30.9 | 123.5 |
| 8 | 8.0 | 5.8 | 0.7 | 17.1 | 137.2 |
| 16 | 16.0 | 10.5 | 0.7 | 9.5 | 152.4 |
| 32 | 32.0 | 18.9 | 0.6 | 5.3 | 169.4 |

| PARALLELISM | POWER (W) | PERFORMANCE | PERFORMANCE/ POWER | PROCESSING TIME (h) | ELECTRIC ENERGY (Wh) |
|---|---|---|---|---|---|
| 1 | 1.0 | 1.0 | 1.0 | 100.0 | 100.0 |
| 2 | 2.0 | 1.8 | 0.9 | 55.6 | 111.1 |
| 4 | 4.0 | 3.2 | 0.8 | 30.9 | 123.5 |
| 8 | 8.0 | 5.8 | 0.7 | 17.1 | 137.2 |
| 16 | 16.0 | 10.5 | 0.7 | 9.5 | 152.4 |
| 32 | 32.0 | 18.9 | 0.6 | 5.3 | 169.4 |

FIG. 12

| PARAMETER | 1st | 2nd | 3rd | 4th |
|---|---|---|---|---|
| ST | 40,000 | 40,000 | 40,000 | 40,000 |
| A(k) | 25% | 25% | 25% | 25% |
| SR | 30,000 | 20,000 | 10,000 | 0 |
| TG | 48.0 | 48.0 | 48.0 | 48.0 |
| TC(k) | 5.3 | 14.8 | 24.3 | 41.4 |
| $\Delta T(k)$ | 5.3 | 9.5 | 9.5 | 17.1 |
| $\Delta T\alpha$ | 0.0 | 0.0 | 0.0 | 0.0 |
| CR | 3 | 2 | 1 | - |
| TP | 43 | 33 | 24 | - |
| $\Delta TP$ | 14 | 17 | 24 | - |
| M(k) | 32 | 16 | 16 | 8 |
| Ceil(($\Delta T(k)/\Delta TP$)*M(k)) | 13 | 9 | 7 | - |
| M(k+1) | 16 | 16 | 8 | - |

# PARALLEL PROCESSING APPARATUS AND PARALLEL PROCESSING METHOD

CROSS-REFERENCE TO RELATED APPLICATION

This application is based upon and claims the benefit of priority of the prior Japanese Patent Application No. 2017-149087, filed on Aug. 1, 2017, the entire contents of which are incorporated herein by reference.

FIELD

The embodiment discussed herein is related to a parallel processing apparatus and a parallel processing method.

BACKGROUND

A desired logic circuit may be produced by writing of functions of logic macros and interconnections among the logic macros into a field-programmable gate array (FPGA). With improvement in circuit integration levels and operating frequencies of FPGAs in recent years, applications have been contrived in which FPGAs are made to execute operational processing executed conventionally by central processing units (CPUs). Thus processing performance of operational processing systems may be improved.

In case where an FPGA is made to execute operational processing executed conventionally by a CPU, processing performance may be further improved by provision of a plurality of identical operational circuits in the FPGA and execution of operations in parallel by the operational circuits. A number of the operational circuits that execute the operations in parallel may be referred to as parallelism or parallel number.

There have been known a parallel computing controller that adjusts parallelism for each job so that all jobs may complete at the same time and a parallel processing apparatus that processes operations for data divided by processing unit with use of a plurality of processors.

Related arts are disclosed in Japanese Laid-open Patent Publication No. 2013-140490 and Japanese Laid-open Patent Publication No. 2010-277579.

SUMMARY

According to an aspect of the embodiments, a parallel processing apparatus includes, a plurality of operational circuits that execute operations for data in parallel, and a control circuit that, upon an end of operations for a first portion of the data, finds estimated operation time for operations for a second portion that is an object of operations subsequent to the first portion, based on target time for operational processing for the data and a data amount of remaining data for which no operation has been executed in the data, finds a second parallelism of the operations for the second portion, based on a first parallelism of the operations for the first portion, a measurement value of operation time for the operations for the first portion, and the estimated operation time, and causes operational circuits, numbering in a number indicated by the second parallelism among the plurality of operational circuits, to execute the operations for the second portion.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 12 illustrates a specific example of the parameters in data processing;

DESCRIPTION OF EMBODIMENT

When operations are executed with a maximum parallelism in an FPGA including a plurality of operational circuits for data processing, power efficiency may decrease and operational costs may increase. When operations are executed with a specified parallelism that has been determined in advance, there is a possibility that data processing is not completed within target time desired by a user.

Such a problem may occur not only in FPGAs including a plurality of operational circuits but also in other parallel processing apparatuses including a plurality of operational circuits that execute operations in parallel.

Hereinbelow, an embodiment will be described in detail with reference to the drawings. When a plurality of operational circuits in an FPGA execute operations in parallel, there is a trade-off relationship between parallelism and performance per unit electric power. As an index indicating the performance, number of operations that are executed per unit time or the like may be used, for instance.

In parallel operations, execution of the operations in parallel by operational circuits numbered in N does not make the performance increase N times, due to overheads relating to synchronization processing between operational processing that is executed in parallel, communication processing for data to be processed, and the like. Thus the performance of an FPGA is not proportional to the parallelism. By contrast, power consumption by an FPGA is generally proportional to the parallelism.

Figures 1, 2:
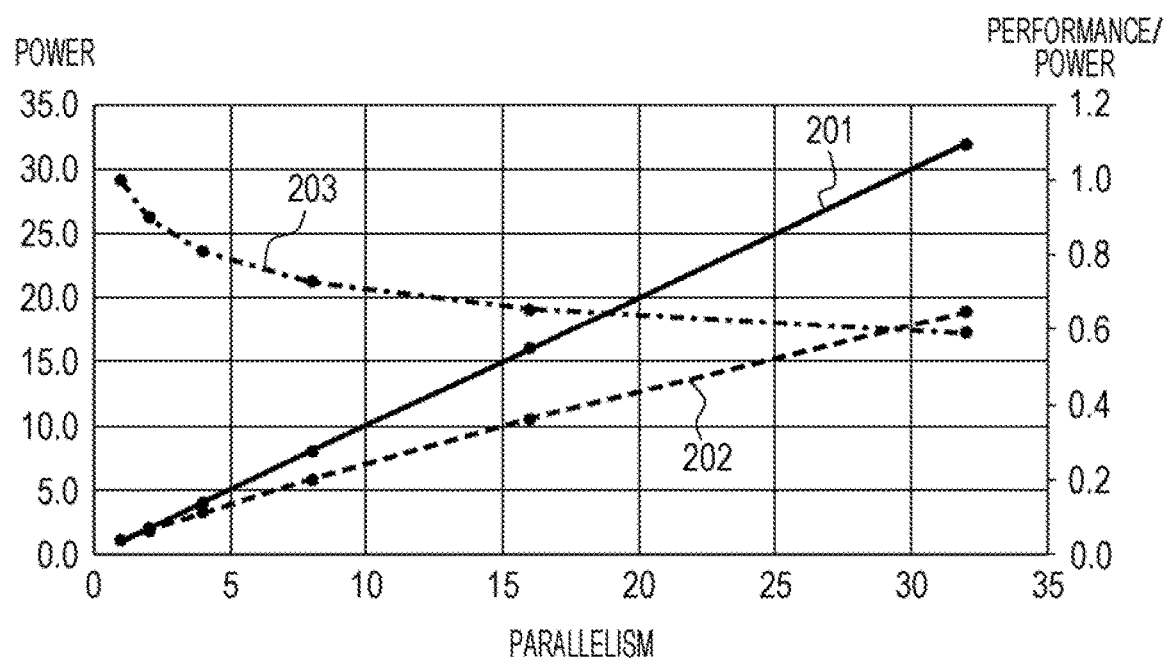
FIG. 1 illustrates a relationship among parallelism, power, and performance in an FPGA.
FIG. 2 illustrates a graph that represents changes in the power, the performance, and performance/power.

FIG. 1 illustrates an example of a relationship among the parallelism, the power, and the performance in an FPGA in processing of ten thousand items of data. For this example, the power (W), the performance, performance/power, processing time (h), and electric energy (Wh) for each of the parallelisms of 1, 2, 4, 8, 16, and 32 are disclosed.

The power represents the power consumption by the FPGA. The performance/power represents the performance of the FPGA per unit electric power. The processing time represents time that is taken for the FPGA to process the ten thousand items of data. The electric energy represents electric energy consumption by the FPGA. With increase in the parallelism, the performance increases, so that the processing time is cut down. With the increase in the parallelism, on the other hand, the power is increased, so that decrease in the performance/power and increase in the electric energy are caused.

FIG. 2 illustrates an example of a graph that represents changes in the power, the performance, and the performance/power corresponding to a change in the parallelism in FIG. 1. In FIG. 2, a horizontal axis represents the parallelism and a vertical axis represents the power, the performance, and the performance/power. A polygonal line 201 represents the change in the power corresponding to the change in the parallelism and a polygonal line 202 represents the change in the performance corresponding to the change in the parallelism. A scale of the performance is the same as a scale of the power. A polygonal line 203 represents the change in the performance/power corresponding to the change in the parallelism.

In the graph of FIG. 2, it is observed that the increase in the parallelism causes the increase in the performance but causes the decrease in the performance/power because a rate of increase in the power exceeds a rate of increase in the performance.

It is often the case that the performance a user desires in processing of a specified number of items of data is completion of the processing of the data within the target time. For instance, batch processing that is executed during nighttime has only to be completed by business start time on the following day and excessive speed-up of the batch processing is not demanded. In case where the parallelism is fixed at a maximum value for the FPGA in such data processing in which high-speed processing is not necessarily demanded, the power consumption increases because the performance per unit electric power decreases, though the processing may be completed within a short period. As a result, the power efficiency decreases and the operational costs increase.

In data processing in which contents of the processing change in accordance with data to be processed, the processing time varies with the data to be processed. In case where operations are executed with a parallelism that has been determined in advance, in such data processing, there is a possibility that the data processing is not completed within the target time.

In image search processing, for instance, rough matching processing may be carried out in a first phase for all images and detailed matching processing may be carried out in a second phase for only images for which high degrees of similarity have been found in the first phase. Thus searching accuracy may be improved.

In such image search processing, the processing time is shortened in case where a large number of images having low degrees of similarity are included in an image set to be searched. In case where a large number of images having high degrees of similarity are included in the image set to be searched, by contrast, the processing time is prolonged. In case where operations are executed with a parallelism that has been determined in advance, therefore, there is a possibility that the image search processing is not completed within the target time.

Figure 3:
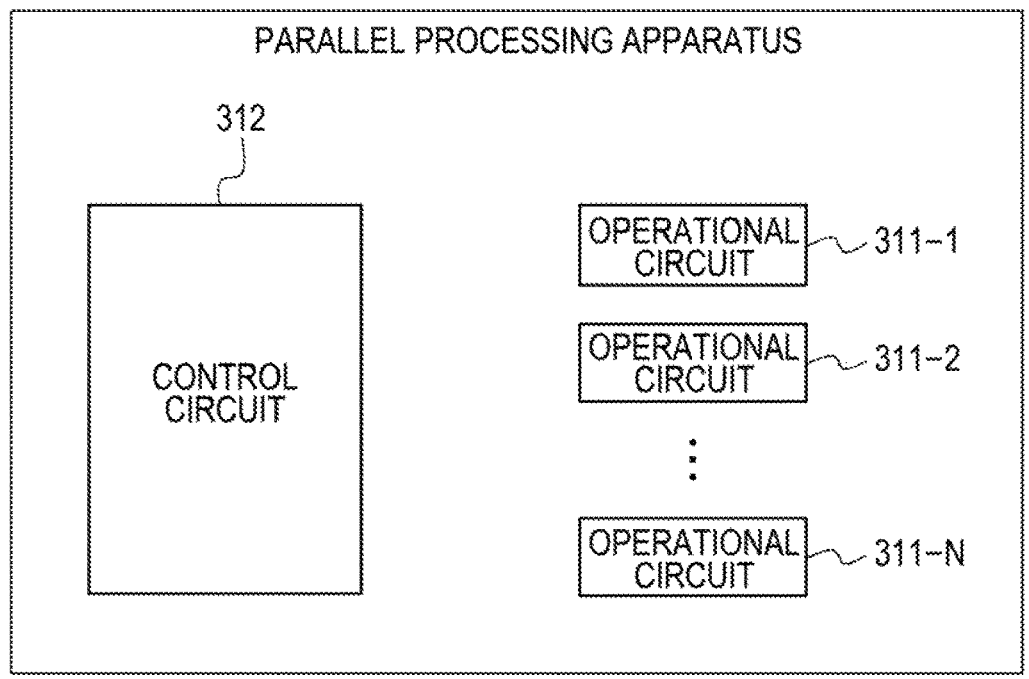
FIG. 3 is a functional configuration diagram of a parallel processing apparatus.

FIG. 3 illustrates a functional configuration example of a parallel processing apparatus of the embodiment. The parallel processing apparatus 301 of FIG. 3 includes operational circuits 311-1 to 311-N(N is an integer equal to or greater than 2) and a control circuit 312. The operational circuits 311-1 to 311-N execute operations for data in parallel. The control circuit 312 controls a parallelism of the operations that are executed by the operational circuits 311-1 to 311-N.

Figure 4:
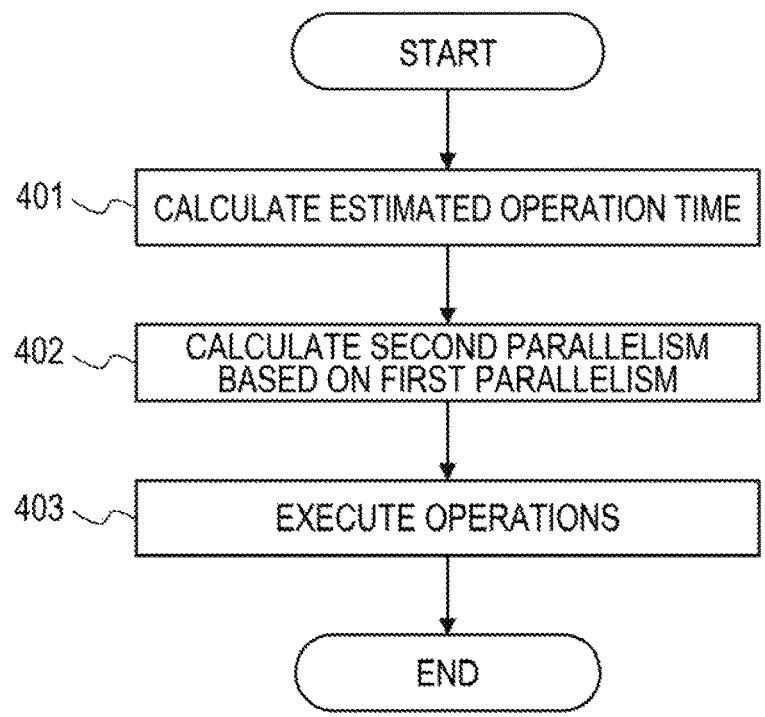
FIG. 4 is a flow chart illustrating control processing.

FIG. 4 is a flow chart illustrating an example of control processing that is carried out by the control circuit 312 of FIG. 3. Upon an end of operations for a first portion of the data, initially, the control circuit 312 finds estimated operation time for operations for a second portion that is an object of operations subsequent to the first portion (step 401). Then the control circuit 312 finds the estimated operation time based on target time for operational processing for the data and a data amount of remaining data for which no operation has been executed in the data.

Subsequently, the control circuit 312 finds a second parallelism of the operations for the second portion, based on a first parallelism of the operations for the first portion, a measurement value of operation time for the operations for the first portion, and the estimated operation time that has been found (step 402). Then the control circuit 312 causes the operational circuits 311-$i$ ($i$=1 to N), numbering in a number indicated by the second parallelism, to execute the operations for the second portion (step 403). By the parallel processing apparatus 301 of FIG. 3, the parallelisms may be appropriately controlled.

Figure 5:
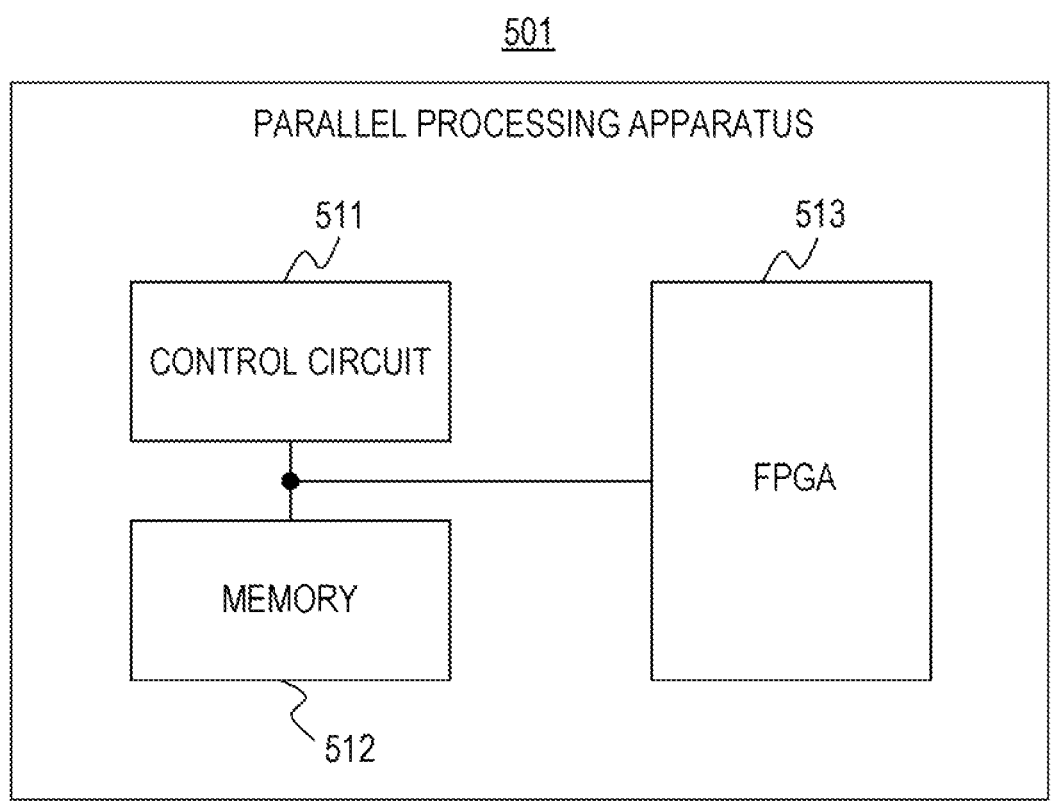
FIG. 5 is a functional configuration diagram illustrating a first specific example of a parallel processing apparatus.

FIG. 5 illustrates a first specific example of the parallel processing apparatus 301 of FIG. 3. A parallel processing apparatus 501 of FIG. 5 includes a control circuit 511, a memory 512, and an FPGA 513. The control circuit 511 corresponds to the control circuit 312 of FIG. 3 and controls operations of the FPGA 513. The memory 512 stores data to be processed and control information that is used for control over the FPGA 513.

The FPGA 513 operates in accordance with a parallelism specified by the control circuit 511 and executes a number of operations whose number is specified by the control circuit 511, in each of a plurality of cycles. Each of the cycles corresponds to operational processing that is executed by the FPGA 513 in accordance with the same parallelism and time of each cycle varies with the parallelism, an amount of data that is processed, and the like. Data processing that is executed by the parallel processing apparatus 501 may be the image search processing, matrix operation in fields of science and technology, simulation processing for climate change or fluid, or the like.

Figure 6:
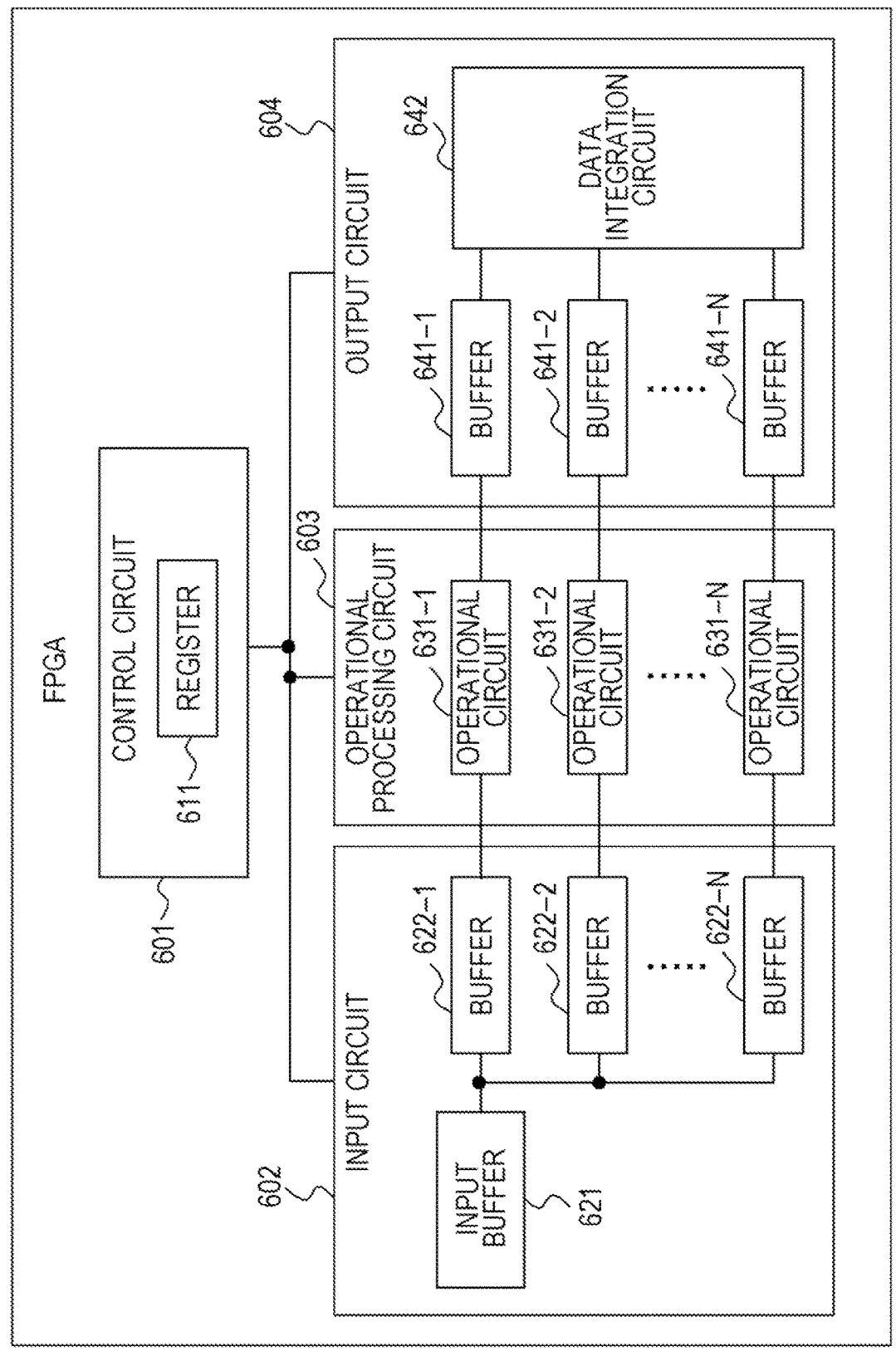
FIG. 6 is a circuit configuration diagram of an FPGA.

FIG. 6 illustrates a circuit configuration example of the FPGA 513 of FIG. 5. The FPGA 513 of FIG. 6 includes a control circuit 601, an input circuit 602, an operational processing circuit 603, and an output circuit 604.

The control circuit 601 includes a register 611. The register 611 stores the parallelism and the number of operations that are specified by the control circuit 511. The control circuit 601 outputs control signals to the input circuit 602, the operational processing circuit 603, and the output circuit 604 so that the operational processing circuit 603 may execute the specified number of operations in accordance with the specified parallelism.

The input circuit 602 includes an input buffer 621 and buffers 622-1 to 622-N. The operational processing circuit 603 includes operational circuits 631-1 to 631-N. The output circuit 604 includes buffers 641-1 to 641-N and a data integration circuit 642. The operational circuits 631-$i$ ($i$=1 to N) are logic operation circuits.

The input buffer 621 receives the data outputted from the memory 512. The input buffer 621 distributes the received data among the buffers 622-$i$ numbering in the number indicated by the specified parallelism, out of the buffers 622-1 to 622-N, in accordance with the control signals outputted from the control circuit 601. The buffers 622-$i$ each output the data to the operational circuits 631-1.

The operational circuits 631-1 to 631-N correspond to the operational circuits 311-1 to 311-N of FIG. 3. The operational circuits 631-$i$, numbering in the number indicated by the specified parallelism, among the operational circuits 631-1 to 631-N each execute the specified number of operations in accordance with the control signals outputted from the control circuit 601. Then the operational circuits 631-$i$ execute the operations for the data outputted from the buffers 622-$i$ and output results of the operations to the buffers 641-1, respectively.

The buffers 641-1 numbering in the number indicated by the specified parallelism, among the buffers 641-1 to 641-N, respectively receive the results of the operations outputted from the operational circuits 631-$i$ and output the results of the operations to the data integration circuit 642. The data integration circuit 642 integrates the results of the operations outputted from the buffers 641-$i$ and transmits the results of the operations to the control circuit 511.

Figure 7:
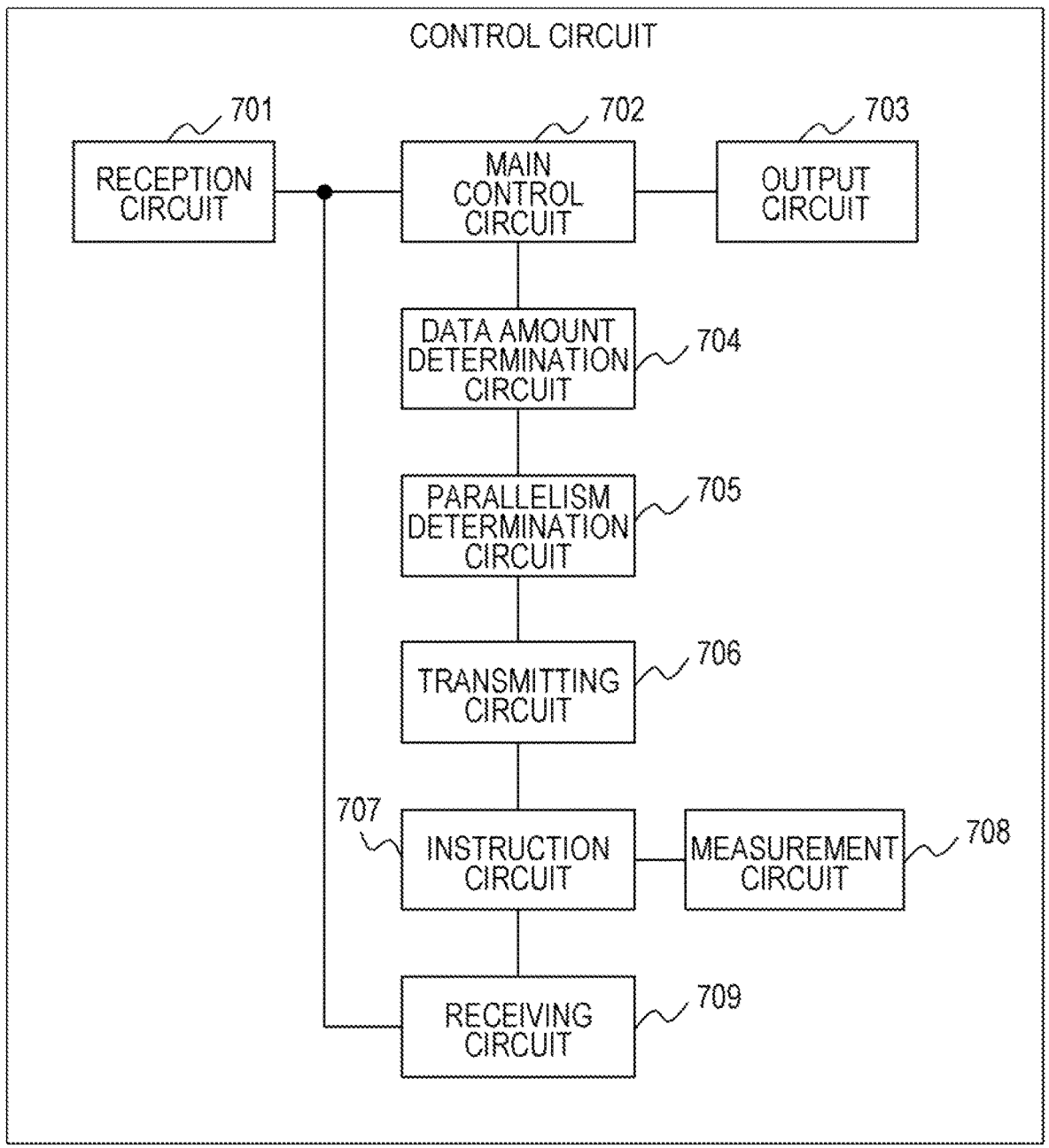
FIG. 7 is a functional configuration diagram of a control circuit.

FIG. 7 illustrates a functional configuration example of the control circuit 511 of FIG. 5. The control circuit 511 of FIG. 7 includes a reception circuit 701, a main control circuit 702, an output circuit 703, a data amount determination circuit 704, a parallelism determination circuit 705, a transmitting circuit 706, an instruction circuit 707, a measurement circuit 708, and a receiving circuit 709.

The reception circuit 701 receives target time from a start to a completion of data processing, from a user. The main control circuit 702 controls flow of the entire data processing and checks whether the processing of the entire data has been completed or not.

When unprocessed data remains, the main control circuit 702 instructs the data amount determination circuit 704 to continue the processing. When the processing of the entire data is completed, the main control circuit 702 instructs the output circuit 703 to output a result of the processing. The main control circuit 702 monitors elapsed time from the start of the data processing up to present time, the processing time per cycle, and the like.

The data amount determination circuit 704 determines a data amount of data to be processed in a subsequent cycle among the data to be processed. Hereinbelow, data to be processed in each cycle may be referred to as a data portion. The first portion and the second portion of the data to be processed correspond to the data portions. The data amount is an important parameter for completion of the data processing in time near to the target time.

The parallelism determination circuit 705 finds the estimated operation time that is taken for the FPGA 513 to execute operations for the data portion for the subsequent cyce, based on the target time, the data amount of remaining data for which no operation has been executed, and operation time for the FPGA 513 in the preceding cycle. The estimated operation time is determined so that total processing time from the start to the completion of the data processing may be equal to or shorter than the target time and may approximate the target time.

The parallelism determination circuit 705 finds a parallelism of the operations for the data portion for the subsequent cycle, based on a parallelism of the operations for the data portion for the preceding cycle, a measurement value of the operation time for the preceding cycle, and the estimated operation time for the subsequent cycle. Thus the parallelism for the subsequent cycle may be set at an optimal value for the completion of the data processing within the target time a user desires and for increase in the power efficiency.

The transmitting circuit 706 transfers the data portion, having the data amount determined by the data amount determination circuit 704, from the memory 512 to the FPGA 513. The instruction circuit 707 outputs the parallelism determined by the parallelism determination circuit 705 and the number of operations for the data portion to the FPGA 513 and instructs the FPGA 513 to execute the parallel operations. The instruction circuit 707 monitors completion of the operations in the FPGA 513. The measurement circuit 708 measures operation time from a start to the completion of the operations in the FPGA 513. The receiving circuit 709 receives the results of the operations for the data portion from the FPGA 513 and outputs the received results of the operations to the main control circuit 702.

Upon an end of the operational processing for one cycle, the operational processing for the subsequent cycle is started. When the processing of the entire data is completed, the output circuit 703 outputs the results of the processing including the results of the operations for each data portion.

In the control circuit 511 of FIG. 7, the parallelism for each cycle may be optimized by adjustment in the parallelism in the FPGA 513 for each cycle.

Subsequently, an example of a method for determining the parallelism for the subsequent cycle based on the parallelism for the preceding cycle by the parallelism determination circuit 705 will be described. Parameters that are used as the control information for the FPGA 513 in calculation of the parallelism are as follows.

ST: data amount of data to be processed

A(k): ratio of data amount of data portion for a k-th cycle (k is an integer equal to or greater than 1) to the data amount ST ($0 \leq A(k) \leq 1$)

SR: data amount of remaining data at time of end of the k-th cycle

TG: target time for data processing for the data to be processed

TC(k): elapsed time from the start of the data processing to the end of the k-th cycle (including processing time other than operation time in the FPGA 513)

Figure 8:
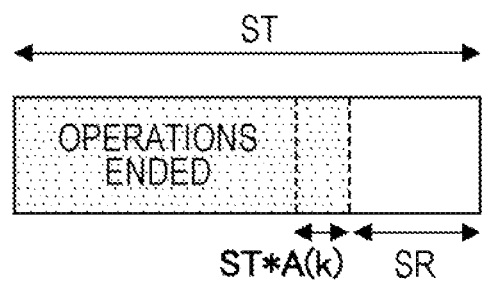
FIG. 8 illustrates a relationship among a plurality of parameters that represent data amounts.

$\Delta T(k)$: operation time in the FPGA 513 in the k-th cycle $\Delta T\alpha$: processing time other than operation time in the FPGA 513 per cycle CR: remaining cycle number at the time of the end of the k-th cycle TP: estimated operation time for the remaining data at the time of the end of the k-th cycle ΔTP: estimated operation time for data portion for k+1-th cycle that is estimated at the time of the end of the k-th cycle M(k): parallelism in the k-th cycle FIG. 8 illustrates an example of a relationship among the plurality of parameters that represent the data amounts. The data amount SR of the remaining data may be found by subtraction of total sum of the data amounts of the data portions for which the operations in the first to k-th cycles have been ended, from the data amount ST of the data to be processed.

A data amount of a data portion in j-th cycle (j=1 to k) is expressed as ST*A(j) and the total sum of the data amounts of the data portions for which the operations in the first to k-th cycles have been ended is therefore expressed as ST*ΣA(j). Here, ΣA(j) represents total sum of A(j) in a range of j=1 to k. Then SR may be found based on an equation that follows.

$$SR = ST - ST*\Sigma A(j) = ST*(1-\Sigma A(j)) \quad (1)$$

$$\Sigma A(j) = A(1) + A(2) + \ldots + A(k) \quad (2)$$

Figure 9:
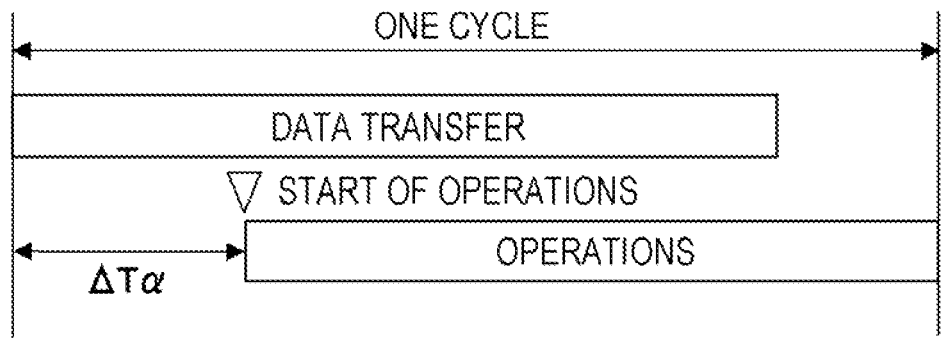
FIG. 9 illustrates processing time other than operation time in the FPGA.

FIG. 9 illustrates an example of the processing time ΔTα other than the operation time in the FPGA 513. ΔTα corresponds to a value obtained by subtraction of the operation time for the FPGA 513 from the processing time in one cycle. When the FPGA 513 starts operations for a data portion, such preprocessing as follows is executed.

(P1) The control circuit 601 selects the operational circuits 631-$i$ to be used for the operations and sets a number of executions in each of the operational circuits 631-$i$, in accordance with the parallelism.

(P2) The control circuit 601 initializes the input circuit 602, the operational processing circuit 603, and the output circuit 604.

(P3) The control circuit 511 transfers the data portion from the memory 512 to the FPGA 513.

Though time for data transfer in (P3) is the longest among above, a portion of the time for the data transfer from a start of the cycle to a start of the operations appears as ΔTα because the data transfer and the operations in the FPGA 513 are carried out in parallel. In case where ΔTα for each cycle exhibits small dispersion, a specified value that has been determined in advance may be used as ΔTα.

The remaining cycle number CR may be found by division of the data amount SR of the remaining data by the data amount ST*A(k+1) of the data portion for the k+1-th cycle.

$$CR = \text{Ceil}(SR/(ST*A(k+1))) \quad (3)$$

Ceil(x) in equation (3) is a function that converts a real number x into the smallest of integers equal to or greater than x. With use of equation (1), equation (3) may be rewritten into an equation that follows.

$$CR = \text{Ceil}(ST*(1-\Sigma A(j))/(ST*A(k+1))) \quad (4)$$

Figure 10:
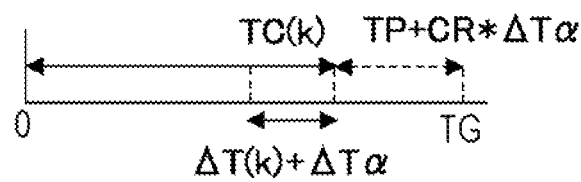
FIG. 10 illustrates a relationship among a plurality of parameters that represent time.

FIG. 10 illustrates an example of a relationship among the plurality of parameters that represent the time. The operation time for the operational processing in the k-th cycle is a sum of the operation time ΔT(k) in the FPGA 513 and the processing time ΔTα other than the operation time. The elapsed time TC(k) is total sum of ΔT(j)+ΔTα in the range of j=1 to k.

On an assumption that values ΔTα in the cycles are the same, the target time TG may be expressed as total sum of the elapsed time TC(k) to the k-th cycle, the estimated operation time TP for the remaining data, and CR*ΔTα.

$$TG = TC(k) + TP + CR*\Delta T\alpha \quad (5)$$

By modification of equation (5), an equation that follows is obtained.

$$TP = TG - TC(k) - CR*\Delta T\alpha \quad (6)$$

On a condition of TP≤0, the target time TG has already elapsed. The estimated operation time ΔTP for the data portion in the k+1-th cycle may be found by division of TP in equation (6) by CR.

$$\begin{aligned}\Delta TP &= TP/CR \\ &= (TG - TC(k) - CR*\Delta T\alpha)/CR \\ &= (TG - TC(k))/CR - \Delta T\alpha\end{aligned} \quad (7)$$

Here, it is assumed that the operation time in the FPGA 513 is inversely proportional to the parallelism. Then the parallelism M(k+1) in the k+1-th cycle may be found by calculation of a product of a ratio of the operation time ΔT(k) in the k-th cycle to the estimated operation time ΔTP and the parallelism M(k) in the k-th cycle.

$$M(k+1) = \text{Ceil}((\Delta T(k)/\Delta TP)*M(k)) \quad (8)$$

When the k-th cycle is ended, the optimal parallelism M(k+1) in the subsequent k+1-th cycle may be found with use of equation (8). In case of ΔTP≤0, the target time TG has already elapsed and the maximum value of the parallelism is therefore used as M(k+1). When M(k+1) in equation (8) exceeds the maximum value of the parallelism, the value of M(k+1) is changed into the maximum value.

In case where integers that may be selected as the parallelism are not consecutive, the smallest integer that may be selected from integers which are equal to or greater than a value of right side of equation (8) is used as M(k+1).

From equation (3), equation (7), and equation (8), M(k+1) may be calculated, if SR, ST*A(k+1), TG, TC(k), ΔTα, ΔT(k), and M(k) are known.

Figure 11:
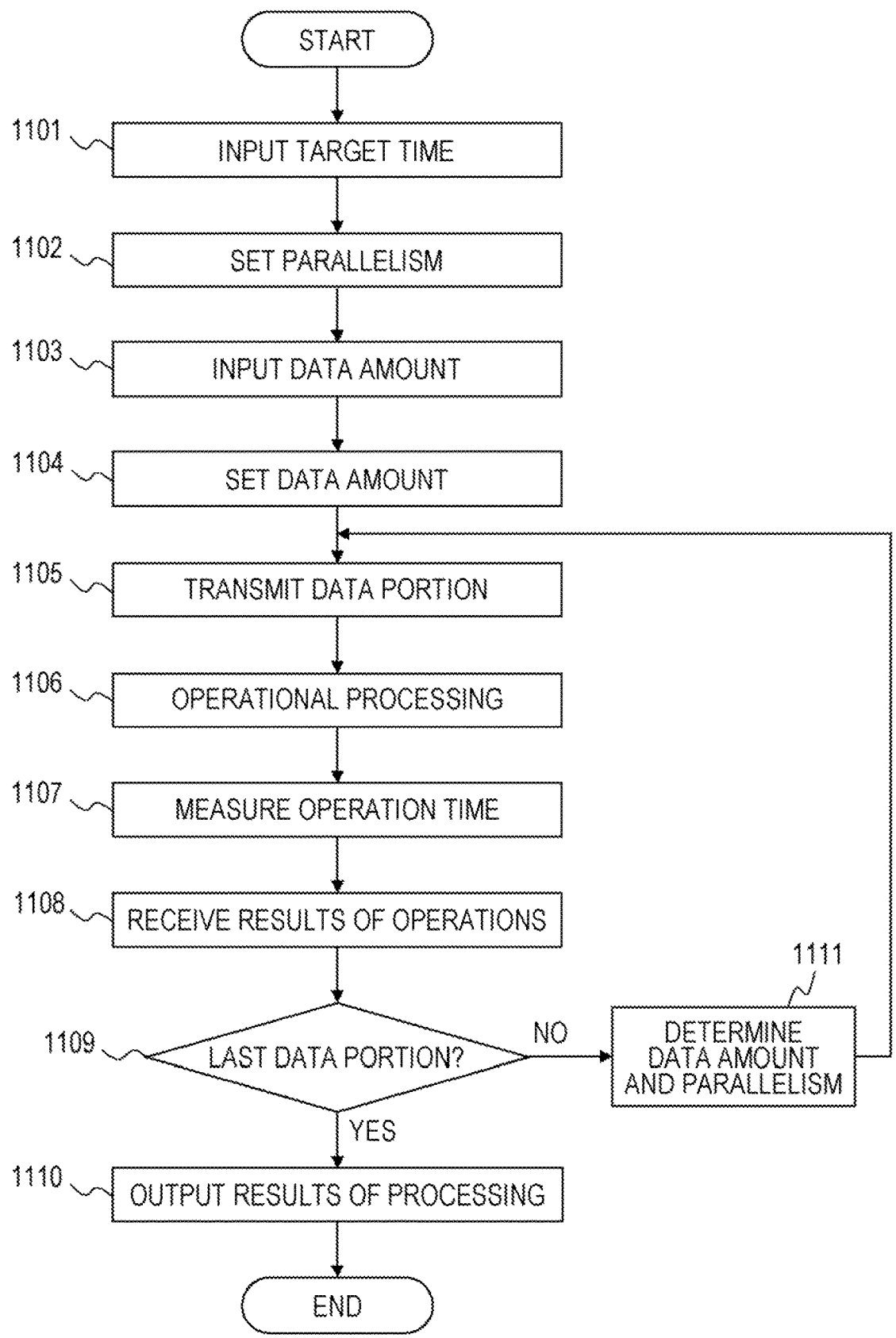
FIG. 11 is a flow chart illustrating a specific example of control processing.

FIG. 11 is a flow chart illustrating a specific example of control processing that is carried out by the control circuit 511 of FIG. 7. Initially, a user inputs the target time TG into the parallel processing apparatus 501 and the reception circuit 701 receives the inputted target time TG (step 1101). Subsequently, the parallelism determination circuit 705 sets the parallelism M(1) for an initial cycle, as an initial value (step 1102). In the FPGA 513 of FIG. 6, for instance, a total number N of the operational circuits 631-$i$ is set as the parallelism M(1).

Subsequently, the user inputs the data amount ST of the data to be processed into the parallel processing apparatus 501 and the reception circuit 701 receives the inputted data amount ST (step 1103). Then the data amount determination circuit 704 determines a percentage A(1) of the data portion to be processed in the initial cycle (step 1104). Thus the data amount ST*A(1) of the initial data portion is determined.

Subsequently, the main control circuit 702 sets a variable k, indicating a cycle, at 1 and the transmitting circuit 706 transfers the data portion, having the data amount ST*A(k), from the memory 512 to the FPGA 513 (step 1105). The instruction circuit 707 outputs control signals, which specify the parallelism M(k) and a number of operations for the data portion having the data amount ST*A(k), to the FPGA 513 and instructs the FPGA 513 to execute the parallel operations (step 1106). The number of operations for the data portion may be determined from the parallelism M(k) and the data amount ST*A(k). For instance, Ceil(ST*A(k)/M(k)) may be used as the number of operations.

The FPGA 513 executes the operational processing in the k-th cycle for the data portion transferred from the memory 512, in accordance with the parallelism M(k) and the number of operations that are specified by the received control signals.

The measurement circuit 708 measures the operation time ΔT(k) in the FPGA 513 (step 1107). The receiving circuit 709 receives the results of the operations in the k-th cycle from the FPGA 513 and outputs the results of the operations to the main control circuit 702 (step 1108). The main control circuit 702 measures the elapsed time TC(k) from the start of the data processing to the end of the k-th cycle.

Subsequently, the main control circuit 702 checks whether the data portion processed by the FPGA 513 is the last data portion or not (step 1109). It is determined that the data portion processed by the FPGA 513 is the last data portion, when the data amount SR of the remaining data is zero, for instance.

In case where the data portion processed by the FPGA 513 is not the last data portion (step 1109, NO), the data amount determination circuit 704 determines the data amount ST*A (k+1) of the data portion to be processed in the k+1-th cycle (step 1111). Then the parallelism determination circuit 705 determines the parallelism M(k+1) for the k+1-th cycle with use of equation (8).

Subsequently, the main control circuit 702 increments the variable k by one and the control circuit 511 iterates processing of step 1105 and later steps for the subsequent cycle.

In case where the data portion processed by the FPGA 513 is the last data portion (step 1109, YES), the output circuit 703 outputs the results of the processing for the entire data (step 1110).

In step 1102, the total number N of the operational circuits 631-1 is used as the parallelism M(1), so that the operations are executed with the maximum parallelism N and at a high speed in the initial cycle. Thus the data processing may be completed within the target time TG, even though the target time TG with a short length is specified. In case where the total processing time with execution of the operations for the entire data in the parallelism N is equal to or longer than the target time TG, the operations for the entire data are executed with the parallelism N.

In the control processing of FIG. 11, even though characteristics of the data to be processed are unknown, the data amount of and the parallelism for the data portion to be processed subsequently may be determined from the time taken for the operational processing for the data portion, while the data is processed little by little. The total processing time may be made to approximate the target time by iteration of the operational processing for the data portion in each cycle even though the characteristics of the data exhibit dispersion.

Besides, the parallelism may be minimized to such an extent that the total processing time is equal to or shorter than the target time and thus the power consumption by the FPGA 513 may be reduced.

FIG. 12 illustrates a specific example of the parameters in the data processing. In this example, the data amount ST of the data to be processed is forty thousand items, the target time TG is 48 hours, and the processing time ΔTα other than the operation time in the FPGA 513 is zero hours. The data amount ST*A(k) of the data portion to be processed in each cycle is fixed at ten thousand items. Therefore, the data to be processed is divided into four data portions, so that the operational processing for the entire data is completed through four cycles.

The total number N of the operational circuits 631-i in the FPGA 513 is 32 and $2^m$ (m=0, 1, 2, 3, 4, 5) may be selected as the parallelism in the FPGA 513. Consequently, the parallelism that may be selected is 1, 2, 4, 8, 16, or 32.

In the initial cycle, the parallelism M(1) is set at 32 and the operations for the data portion having ten thousand items are executed with the parallelism of 32, for instance. When the initial cycle is ended, the data amount SR of the remaining data is thirty thousand items and the data amount ST*A(2) of the data portion for the subsequent cycle is ten thousand items. The elapsed time TC(1) is 5.3 hours and the operation time ΔT(1) in the initial cycle is 5.3 hours as well.

Then the remaining cycle number CR is 3, based on equation (3). The estimated operation time TP for the remaining data is 43 hours, based on equation (6), and the estimated operation time ΔTP for the data portion in the subsequent cycle is 14 hours, based on equation (7). As a result, the value of the right side of equation (8) is 13 and thus the minimum selectable parallelism of 16 among integers equal to or greater than 13 is set as the parallelism M(2) for the subsequent cycle.

In the second cycle, the operations for the data portion having ten thousand items are executed with the parallelism of 16. Then SR is made into twenty thousand items and ST*A(3) is ten thousand items. Besides, TC(2) is 14.8 hours and ΔT(2) is 9.5 hours. Then CR is 2, based on equation (3), TP is 33 hours, based on equation (6), and ΔTP is 17 hours, based on equation (7). As a result, the value of the right side of equation (8) is 9 and thus the minimum selectable parallelism of 16 among integers equal to or greater than 9 is set as the parallelism M(3) for the subsequent cycle.

In the third cycle, the operations for the data portion having ten thousand items are executed with the parallelism of 16. Then SR is made into ten thousand items and ST*A(4) is ten thousand items as well. Besides, TC(3) is 24.3 hours and ΔT(3) is 9.5 hours. Then CR is 1, based on equation (3), TP is 24 hours, based on equation (6), and ΔTP is 24 hours, based on equation (7). As a result, the value of the right side of equation (8) is 7 and thus the minimum selectable parallelism of 8 among integers equal to or greater than 7 is set as the parallelism M(4) for the subsequent cycle.

In the fourth cycle, the operations for the last data portion having ten thousand items are executed with the parallelism of 8 and the operations for the entire data is consequently ended. Then TC(4) is 41.4 hours and it is found that the operations for the entire data have been completed in the total processing time that approximates the target time of 48 hours.

Figure 13:
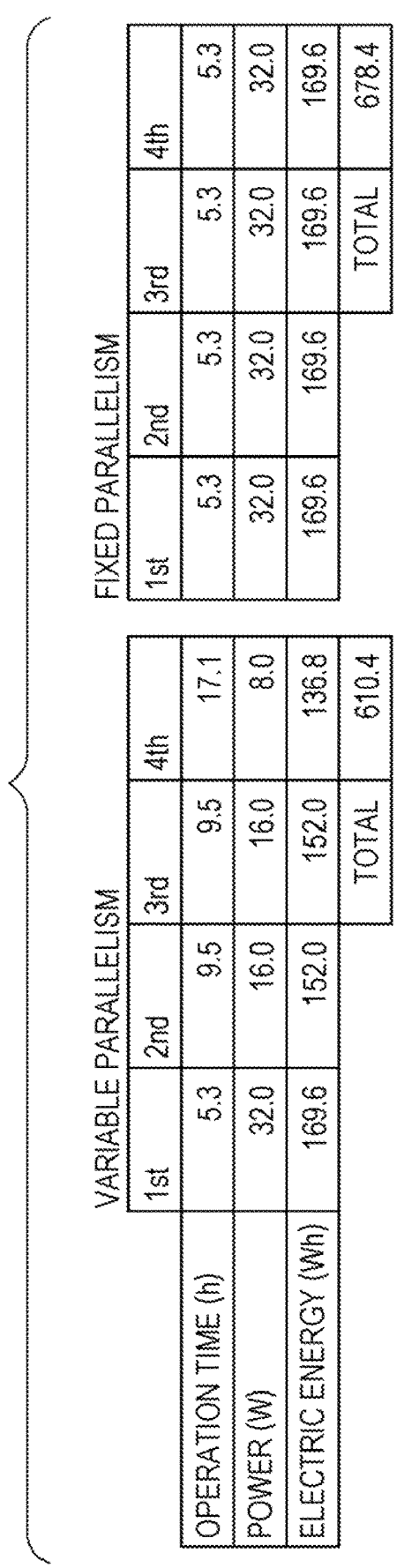
FIG. 13 illustrates power consumption and electric energy consumption in the data processing.

FIG. 13 illustrates examples of the power consumption and the electric energy consumption in the data processing. The operation time in case of the variable parallelism in FIG. 13 corresponds to ΔT(k) in each cycle in FIG. 12. The power and the electric energy in FIG. 13 represent the power consumption and the electric energy consumption in the FPGA 513 in each cycle. Total electric energy consumption in the four cycles is 610.4 Wh.

In FIG. 13, on the other hand, the operation time, the power, and the electric energy in case of the fixed parallelism represent values in the data processing of FIG. 12 in which the parallelism in each cyde is fixed at 32. In this case, the total electric energy consumption in the four cycles is 678.4 Wh. It is found that change in the parallelism for each cycle with application of the control processing of FIG. 11 reduces the electric energy consumption by 68 Wh (about 10%) in comparison with the total electric energy consumption on the condition that the parallelism is fixed at the maximum value.

Figure 14A:
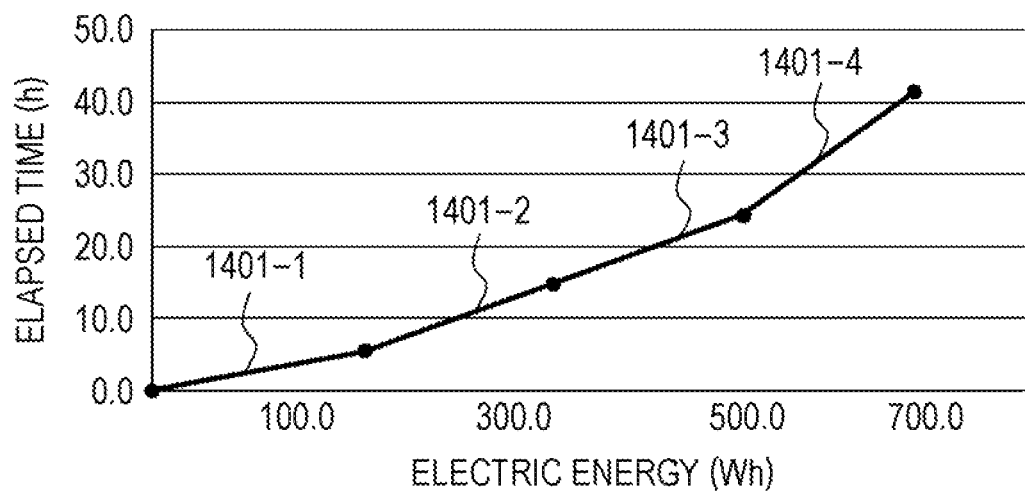
FIGS. 14A and 14B illustrate relationships between the electric energy consumption and elapsed time in the data processing.
Figure 14B:
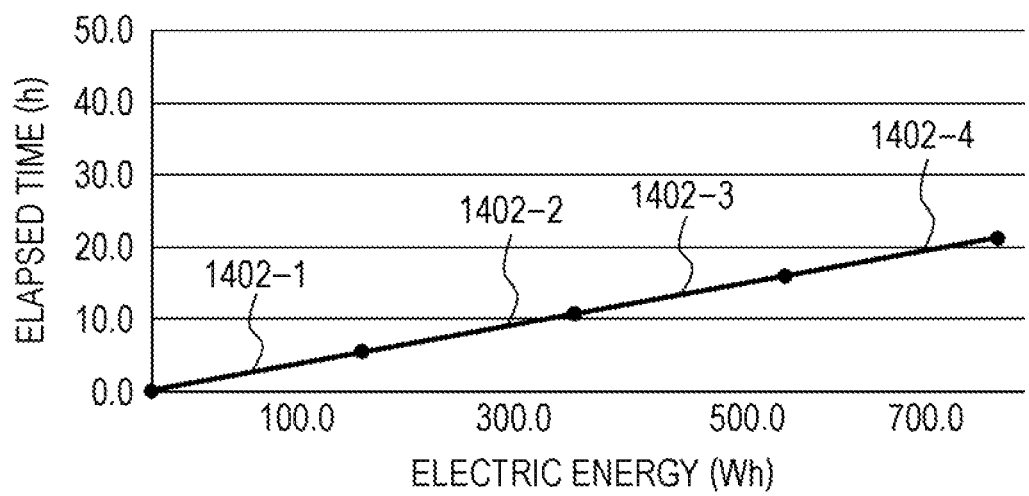

FIGS. 14A and 14B illustrate examples of relationships between the electric energy consumption and the elapsed time in the data processing. The elapsed time corresponds to TC(k) in FIG. 12. FIG. 14A illustrates the relationship between the electric energy consumption and the elapsed time in the case of the variable parallelism in FIG. 13. A polygonal line 1401-$k$ ($k$=1 to 4) represents changes in the electric energy consumption and the elapsed time in the k-th cycle.

FIG. 14B illustrates the relationship between the electric energy consumption and the elapsed time in the case of the fixed parallelism in FIG. 13. A polygonal line 1402-$k$ ($k$=1 to 4) represents changes in the electric energy consumption and the elapsed time in the k-th cycle.

In case where the parallelism is fixed at the maximum value, the data processing may be completed in the shorter time but the total electric energy consumption increases, in comparison with the condition that the parallelism is changed for each cycle. On the other hand, by processing the data divided in accordance with the target time with the optimal parallelism, the data processing in which the electric energy consumption is minimized may be attained.

In the data processing in which the contents of the processing change in accordance with the data to be processed, the operation time varies depending on the characteristics of the data, even for the data portions having the same data amount. In order to complete the data processing within time near to the target time, accordingly, it is desirable to change the data amount of the data portion in each cycle, rather than to fix the data amount of the data portion to be processed in each cycle.

In case where there is a difference between the processing time in the subsequent cycle that is predicted based on the operation time in the preceding cycle (predicted processing time) and actual processing time in the subsequent cycle, the total processing time may be made to approximate the target time by correction of the difference.

Increase in the data amount per cycle, however, causes decrease in a cycle number for the processing of the entire data and results in decrease in a number of opportunities to adjust the parallelism. When a large difference exists between the predicted processing time and the actual processing time, accordingly, it is difficult to correct the difference. By contrast, decrease in the data amount per cycle causes increase in the cycle number and results in increase in the number of opportunities to adjust the parallelism. Accordingly, the difference between the predicted processing time and the actual processing time decreases, so that the correction of the difference is facilitated in the remaining cycles. The processing time other than the operation time in the FPGA 513, however, is generated in surplus all the more for the increase in the cycle number.

The predicted processing time in the subsequent cycle may be calculated from the operation time measured in the preceding cycle. In case where the characteristics of the data exhibit large dispersion between the data portion for the preceding cycle and the data portion for the subsequent cycle, in this calculation, the predicted processing time may greatly deviate from the actual processing time.

In case where there is a large difference between the predicted processing time and the actual processing time, a control method is conceivable in which the number of the opportunities to adjust the parallelism is increased by decrease in the data amounts of the data portions and the increase in the cycle number. By contrast, in case where there is a small difference between the predicted processing time and the actual processing time, it may be estimated that the characteristics of the data exhibit small dispersion and thus the data amounts of the data portions are allowed to be increased.

The actual processing time TA(k) in the k-th cycle is found with use of the operation time $\Delta T(k)$ in the k-th cycle by an equation that follows.

$$TA(k) = \Delta T(k) + \Delta T\alpha \qquad (9)$$

On an assumption that the operation time in the FPGA 513 is inversely proportional to the parallelism, the operation time $\Delta TX(k)$ in the k-th cycle that is predicted from the operation time $\Delta T(k-1)$ in the k-1-th cycle is found by an equation that follows.

$$\Delta TX(k) = (M(k-1)/M(k)) * \Delta T(k-1) \qquad (10)$$

The predicted processing time TX(k) in the k-th cycle is found with use of $\Delta TX(k)$ in equation (10) by an equation that follows.

TX(k)=$\Delta$TX(k)+$\Delta$T$\alpha$ $$\begin{aligned} TX(k) &= \Delta TX(k) + \Delta T\alpha \qquad (11) \\ &= (M(k-1)/M(k)) * \Delta T(k-1) + \Delta T\alpha \end{aligned}$$

Based on equation (9) and equation (11), the difference $\Delta V$ between the predicted processing time TX(k) and the actual processing time TA(k) in the k-th cycle is found by an equation that follows.

$$\begin{aligned} \Delta V &= |TA(k) - TX(k)| \qquad (12) \\ &= |(\Delta T(k) + \Delta T\alpha) - \\ &\quad ((M(k-1)/M(k)) * \Delta T(k-1) + \Delta T\alpha)| \\ &= |\Delta T(k) - (M(k-1)/M(k)) * \Delta T(k-1)| \end{aligned}$$

The data amount determination circuit 704 is capable of increasing and decreasing the data amount, based on the difference $\Delta V$ of equation (12).

Figure 15:
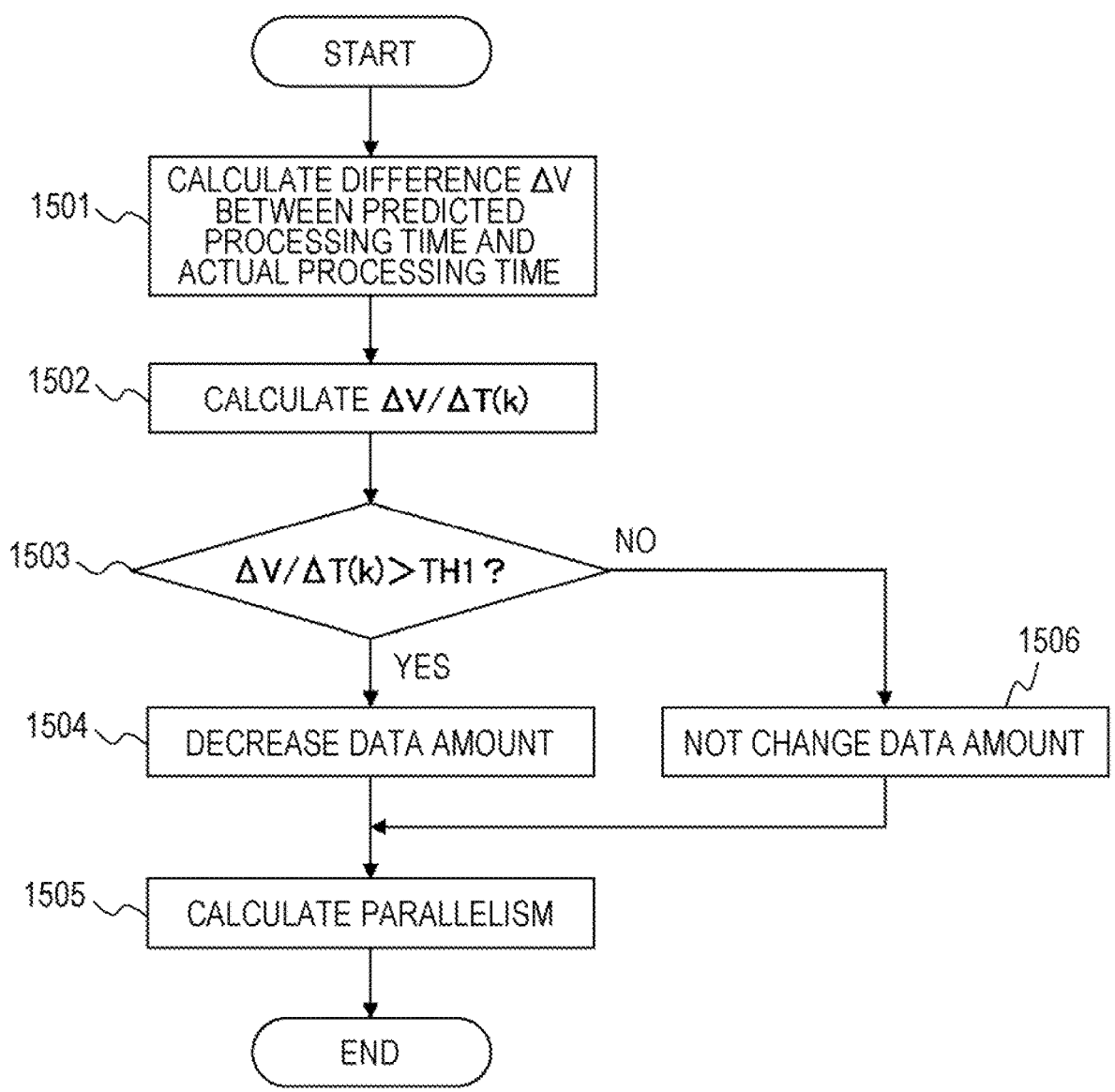
FIG. 15 is a flow chart illustrating determination processing in which the data amounts are decreased.

FIG. 15 is a flow chart illustrating an example of determination processing in which the data amount is decreased in step 1111 of FIG. 11. Initially, the data amount determination circuit 704 calculates the difference $\Delta V$ between the predicted processing time TX(k) and the actual processing time TA(k) in the k-th cycle with use of equation (12) (step 1501) and calculates $\Delta V/\Delta T(k)$ (step 1502).

Subsequently, the data amount determination circuit 704 compares $\Delta V/\Delta T(k)$ with a threshold TH1 (step 1503). When $\Delta V/\Delta T(k)$ is larger than TH1 (step 1503, YES), the data amount determination circuit 704 decreases the data amount ST*A(k+1) of the data portion in the k+1-th cycle (step 1504).

Then the data amount determination circuit 704 calculates a percentage A(k+1) of the data amount of the data portion in the k+1-th cycle with use of an equation that follows.

$$A(k+1) = A(k) - \Delta A \qquad (13)$$

In equation (13), $\Delta A$ is a specified value in a range of $0 < \Delta A \leq A(k)$. The data amount determination circuit 704 calculates ST*A(k+1) by multiplication of ST and A(k+1). Thus ST*A(k+1) is decreased by a specified value ST*$\Delta A$.

Subsequently, the parallelism determination circuit 705 calculates the parallelism M(k+1) in the k+1-th cycle from equation (3), equation (7), and equation (8) with use of ST*A(k+1) calculated by the data amount determination circuit 704 (step 1505).

On the other hand, when ΔV/ΔT(k) is equal to or smaller than TH1 (step 1503, NO), the data amount determination circuit 704 does not change ST*A(k+1) (step 1506). Then the data amount determination circuit 704 calculates ST*A(k+1) with use of A(k) as A(k+1) without modification and the parallelism determination circuit 705 executes processing of step 1505.

Comparison of ΔV/ΔT(k) with the threshold TH1 in step 1503 is equivalent to comparison of ΔV with TH1*ΔT(k) with use of TH1*ΔT(k) as a threshold. A condition that ΔV/ΔT(k) is larger than TH1 corresponds to a condition that ΔV is larger than TH1*ΔT(k) and a condition that ΔV/ΔT(k) is equal to or smaller than TH1 corresponds to a condition that ΔV is equal to or smaller than TH1*ΔT(k).

When the difference ΔV between the predicted processing time and the actual processing time is larger than TH1*ΔT(k), in the determination processing of FIG. 15, the number of the opportunities to adjust the parallelism may be increased by decrease in ST*A(k+1).

Figure 16:
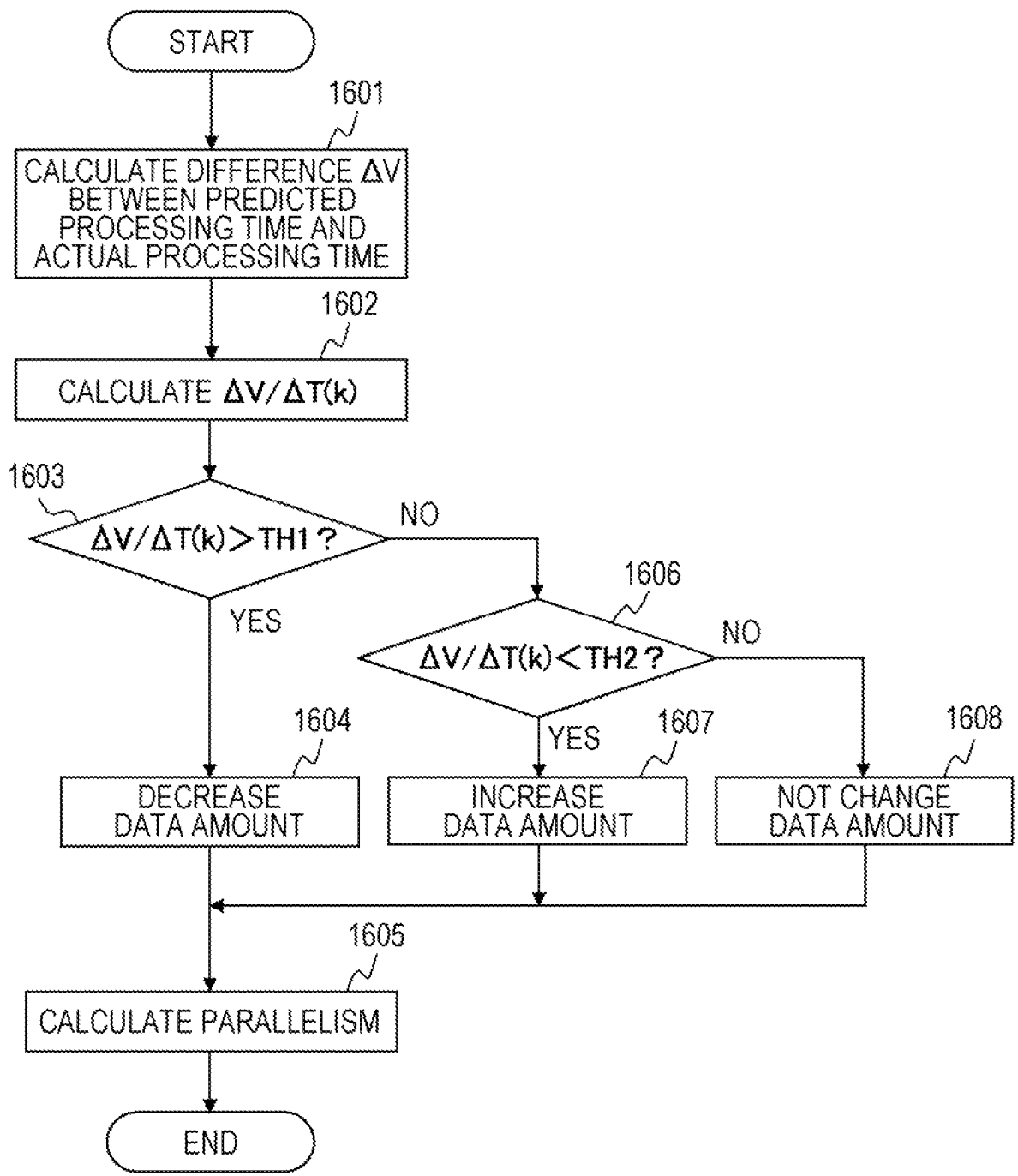
FIG. 16 is a flow chart illustrating determination processing in which the data amounts are increased or decreased.

FIG. 16 is a flow chart illustrating an example of determination processing in which the data amount is increased or decreased in step 1111 of FIG. 11. Processing of steps 1601 to 1605 is similar to the processing of steps 1501 to 1505 in FIG. 15.

When ΔV/ΔT(k) is equal to or smaller than TH1 (step 1603, NO), the data amount determination circuit 704 compares ΔV/ΔT(k) with a threshold TH2 smaller than the threshold TH1 (step 1606). When ΔV/ΔT(k) is smaller than TH2 (step 1606, YES), the data amount determination circuit 704 increases ST*A(k+1) (step 1607). Then the data amount determination circuit 704 calculates A(k+1) with use of an equation that follows and calculates ST*A(k+1) by the multiplication of ST and A(k+1).

$$A(k+1)=A(k)+\Delta A \quad (14)$$

Thus ST*A(k+1) is increased by the specified value ST*ΔA. Then the parallelism determination circuit 705 executes processing of step 1605.

On the other hand, when ΔV/ΔT(k) is equal to or larger than TH2 (step 1606, NO), the data amount determination circuit 704 does not change ST*A(k+1) (step 1608). Then the data amount determination circuit 704 calculates ST*A(k+1) with use of A(k) as A(k+1) without modification and the parallelism determination circuit 705 executes the processing of step 1605.

Comparison of ΔV/ΔT(k) with the threshold TH2 in step 1606 is equivalent to comparison of ΔV with TH2*ΔT(k) with use of TH2*ΔT(k) as a threshold. A condition that ΔV/ΔT(k) is smaller than TH2 corresponds to a condition that ΔV is smaller than TH2*ΔT(k) and a condition that ΔV/ΔT(k) is equal to or larger than TH2 corresponds to a condition that ΔV is equal to or larger than TH2*ΔT(k).

When the difference ΔV between the predicted processing time and the actual processing time is smaller than TH2*ΔT(k), in the determination processing of FIG. 16, the cycle number may be decreased by increase in ST*A(k+1). Total sum of the processing time other than the operation time in the FPGA 513 is reduced all the more for the decrease in the cycle number, so that the operations in the remaining cycles may be executed with a smaller parallelism.

Though the FPGA 513 executes the parallel operations for the data in the parallel processing apparatus of FIG. 5, another apparatus that executes the parallel operations may be used in place of the FPGA 513. As another apparatus that executes the parallel operations, a graphics processing unit (GPU), a parallel computer, and the like may be enumerated, for instance.

Figure 17:
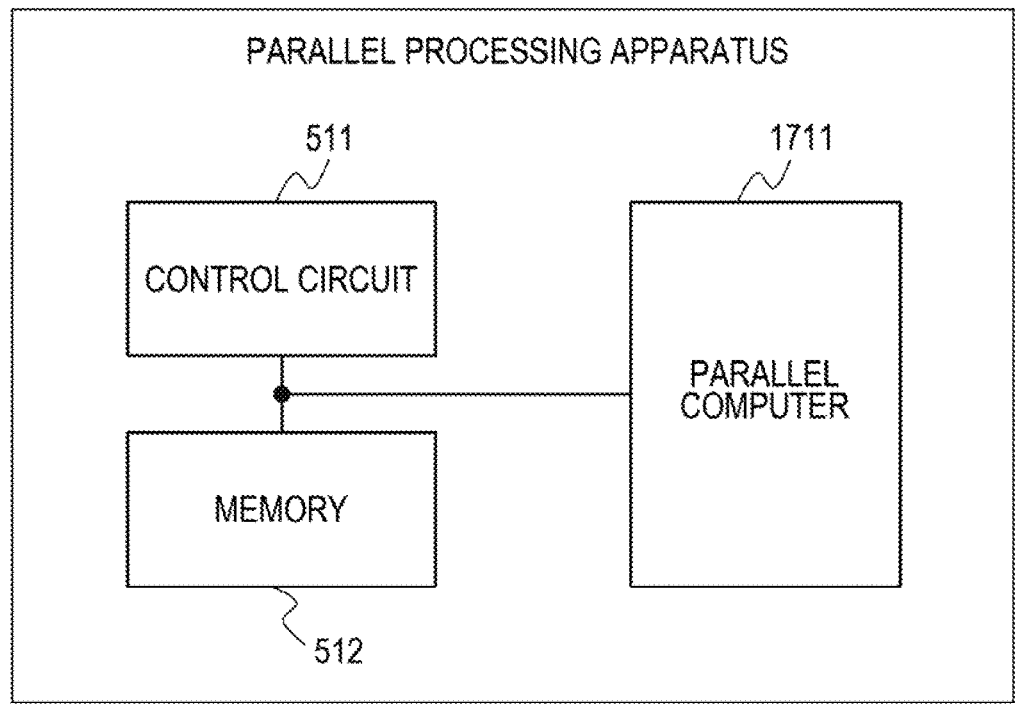
FIG. 17 is a functional configuration diagram illustrating a second specific example of a parallel processing apparatus.

FIG. 17 illustrates a second specific example of the parallel processing apparatus. A parallel processing apparatus 1701 of FIG. 17 has a configuration in which a parallel computer 1711 is substituted for the FPGA 513 of FIG. 5. In each of a plurality of cycles, the parallel computer 1711 operates in accordance with a parallelism specified by the control circuit 511 and executes a number of operations whose number is specified by the control circuit 511.

Figure 18:
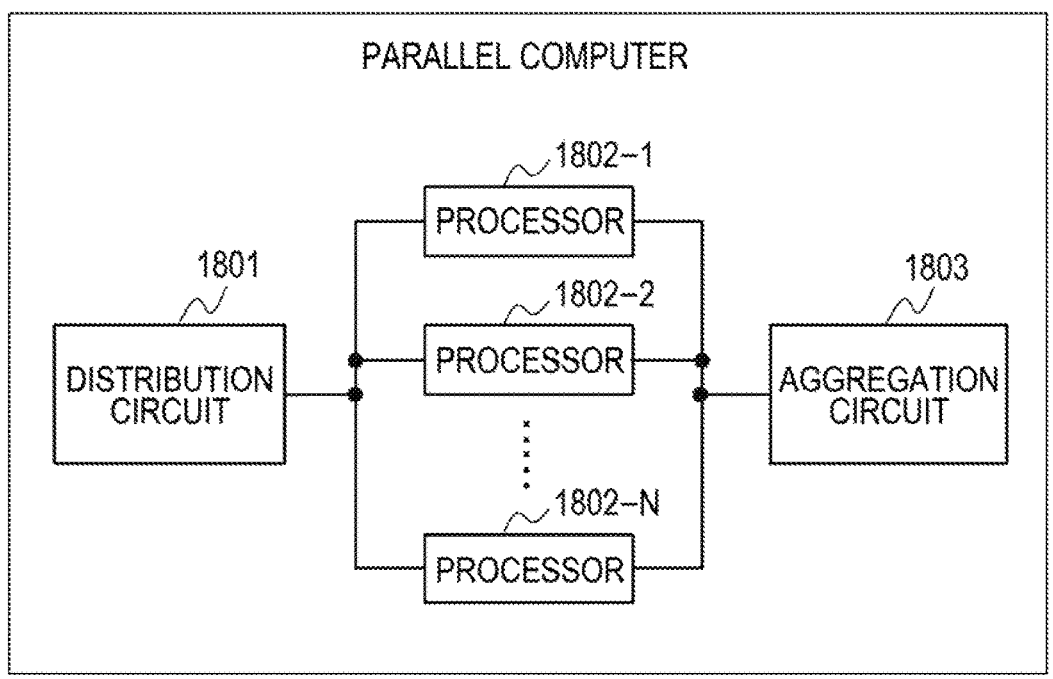
FIG. 18 is a configuration diagram of a parallel computer.

FIG. 18 illustrates a configuration example of the parallel computer 1711 of FIG. 17. The parallel computer 1711 of FIG. 18 includes a distribution unit 1801, processors 1802-1 to 1802-N, and an aggregation unit 1803. The processors 1802-1 to 1802-N correspond to the operational circuits 311-1 to 311-N of FIG. 3.

The distribution unit 1801 receives the parallelism and the number of operations from the control circuit 511 and receives data from the memory 512. The distribution unit 1801 distributes the received data among processors 1802-i (i=1 to N) numbering in a number indicated by the received parallelism, out of the processors 1802-1 to 1802-N, and gives the processors 1802-i instructions to execute the received number of operations.

The processors 1802-i among which the data has been distributed by the distribution unit 1801 execute the number of operations specified in the instructions and output results of the operations to the aggregation unit 1803. The aggregation unit 1803 aggregates the results of the operations outputted from the processors 1802-1 and transmits the results of the operations to the control circuit 511.

Each of the configurations of the parallel processing apparatus 301 of FIG. 3, the parallel processing apparatus 501 of FIG. 5, and the parallel processing apparatus 1701 of FIG. 17 is merely an example and may have some of components omitted or modified in accordance with an application or conditions of the parallel processing apparatus.

Each of the configurations of the FPGA 513 of FIG. 6, the control circuit 511 of FIG. 7, and the parallel computer 1711 of FIG. 18 is merely an example and may have some of components omitted or modified in accordance with the application or the conditions of the parallel processing apparatus.

Each of the flow charts of FIGS. 4, 11, 15, and 16 is merely an example and may have some portions of the processing omitted or modified in accordance with the configuration or the conditions of the parallel processing apparatus. In step 1101 and step 1103 in FIG. 11, for instance, the reception circuit 701 may acquire the target time and the data amount from an external device, instead of receiving the target time and the data amount that are inputted by the user. In step 1102, the parallelism determination circuit 705 may set an integer smaller than the total number N of the operational circuits 631-i as the parallelism M(1) in the initial cycle.

Each of the parallelism, the power, the performance, the performance/power, the processing time, and the electric energy in FIGS. 1 and 2 is merely an example and those values vary with the configuration or the conditions of the parallel processing apparatus. Each of the relationships among the parameters in FIGS. 8 to 10 is merely an example and other parameters may be allowed to be used. Each of the parameters in FIG. 12 and the power and the electric energy in FIGS. 13, 14A, and 14B are merely an example and those values vary with the configuration or the conditions of the parallel processing apparatus and with the data to be processed.

Each of equation (1) to equation (14) is merely an example and the control circuit 511 may execute the control processing with use of other calculus equations.

Figure 19:
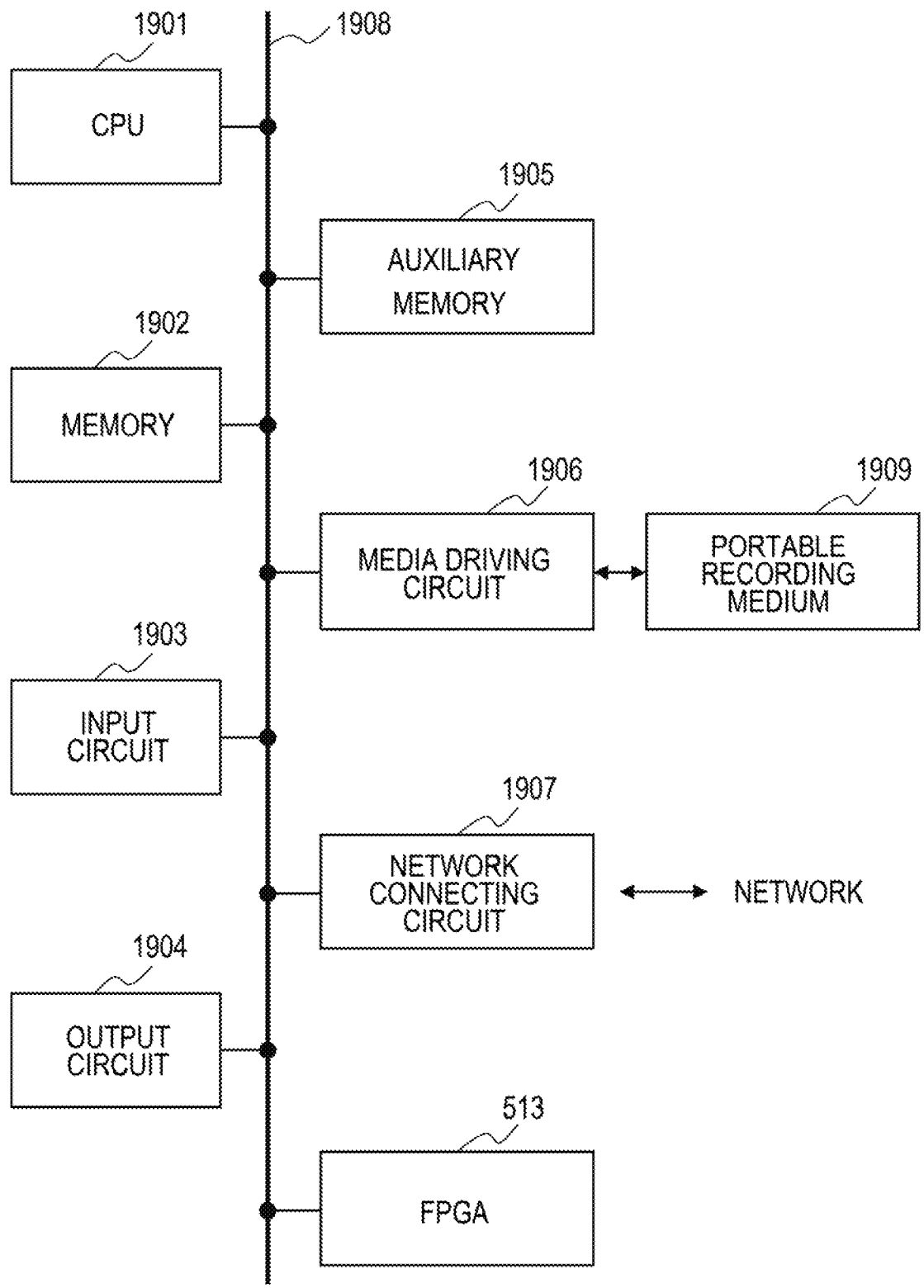
FIG. 19 is a configuration diagram of an information processing apparatus.

FIG. 19 illustrates a configuration example of an information processing apparatus (computer) that is used as the parallel processing apparatus 301 of FIG. 3 and the parallel processing apparatus 501 of FIG. 5. The information processing apparatus of FIG. 19 includes the FPGA 513, a CPU 1901, a memory 1902, an input device 1903, an output device 1904, an auxiliary storage device 1905, a media driving device 1906, and a network connecting device 1907. Those components are connected to one another by a bus 1908.

The memory 1902 is a semiconductor memory such as a read only memory (ROM), a random access memory (RAM), and a flash memory, for instance, and stores programs and data that are used for processing. The memory 1902 may be used as the memory 512 of FIG. 5.

The CPU 1901 (processor) operates as the control circuit 312 of FIG. 3 and the control circuit 511 of FIG. 5 by executing the programs with use of the memory 1902, for instance.

The CPU 1901 also operates as the reception circuit 701, the main control circuit 702, and the output circuit 703 of FIG. 7 by executing the programs with use of the memory 1902. The CPU 1901 also operates as the data amount determination circuit 704, the parallelism determination circuit 705, the transmitting circuit 706, the instruction circuit 707, the measurement circuit 708, and the receiving circuit 709 by executing the programs with use of the memory 1902. When operating as the transmitting circuit 706, the instruction circuit 707, and the receiving circuit 709, the CPU 1901 accesses the FPGA 513 with use of an FPGA driver.

The input device 1903 is a keyboard, a pointing device, or the like, for instance, and is used for input of instructions and information from an operator or a user. The output device 1904 is a display device, a printer, a speaker, or the like, for instance, and is used for output of an inquiry or instructions to the operator or the user and the processing results of the data processing.

The auxiliary storage device 1905 is a magnetic disk device, an optical disk device, a magneto-optic disk device, a tape device, or the like, for instance. The auxiliary storage device 1905 may be a hard disk drive or a flash memory. In the information processing apparatus, the programs and the data may be stored in the auxiliary storage device 1905 and may be used by being loaded on the memory 1902. The auxiliary storage device 1905 may be used as the memory 512 of FIG. 5.

The media driving device 1906 drives a portable recording medium 1909 and accesses contents recorded in the portable recording medium 1909. The portable recording medium 1909 is a memory device, a flexible disk, an optical disk, a magneto-optic disk, or the like. The portable recording medium 1909 may be a compact disk read only memory (CD-ROM), a digital versatile disk (DVD), a universal serial bus (USB) memory, or the like. The operator or the user may store the programs and the data in the portable recording medium 1909 and may use the programs and the data by loading the programs and the data on the memory 1902.

Thus the computer-readable recording media in which the programs and the data that are used for the processing are stored are physical (non-transitory) recording media such as the memory 1902, the auxiliary storage device 1905, or the portable recording medium 1909.

The network connecting device 1907 is a communication interface circuit that is connected to a communication network such as a local area network or a wide area network and that carries out data conversion involved by communication. The information processing apparatus may receive the programs and the data from an external device via the network connecting device 1907 and may use the programs and the data by loading the programs and the data on the memory 1902.

The information processing apparatus does not have to include all components of FIG. 19 and some of the components may be omitted in accordance with the application or the conditions. In case where the information processing apparatus has no dialog with the operator or the user, for instance, the input device 1903 and the output device 1904 may be omitted. In case where the portable recording medium 1909 or the communication network is not used, the media driving device 1906 or the network connecting device 1907 may be omitted.

The information processing apparatus of FIG. 19 may be used as the parallel processing apparatus 1701 of FIG. 17. In this case, the parallel computer 1711 is connected in place of the FPGA 513 to the bus 1908.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A parallel processing apparatus comprising:
   a plurality of operational circuits configured to execute operations for data in parallel, the data including at least a first portion and a second portion, the second portion of the data being an object of operations subsequent to the first portion of the data; and
   a control circuit configured to execute a first processing upon an end of operations for the first portion of the data, the first processing including
      obtaining estimated operation time for operations for the second portion of the data based on target time for operational processing for the data and a data amount of remaining data for which no operation has been executed in the data,
      determining a second parallelism degree of the operations for the second portion of the data, based on a first parallelism degree of the operations for the first portion of the data, a measurement value of operation time for the operations for the first portion of the data, and the estimated operation time, the second portion of the data is a portion for which no operation has been executed, and
      causing operational circuits, numbering in a number indicated by the second parallelism among the plurality of operational circuits, to execute the operations for the second portion,
   the control circuit calculates a difference between predicted processing time for the operational processing for the first portion and actual processing time for the operational processing for the first portion, based on a measurement value of operation time for operations for a third portion that is an object of operations precedent to the first portion, a third parallelism of the operations for the third portion, the measurement value of the operation time for the operations for the first portion, and the first parallelism, and, when the difference exceeds a first threshold, decreases a data amount of the second portion below a data amount of the first portion.

2. The parallel processing apparatus according to claim 1, wherein the control circuit determines the estimated operation time, so that processing time for the operational processing for the data is equal to or shorter than the target time and a difference between the processing time and the target time is smaller than a threshold, and repeats control in which the operational circuits numbering in the number indicated by the second parallelism are made to execute the operations for the second portion, with each of a plurality of portions of the data regarded as the first portion, until operations for a last portion are ended.

3. The parallel processing apparatus according to claim 1, wherein, when the difference is below a second threshold that is below the first threshold, the control circuit increases the data amount of the second portion more than the data amount of the first portion.

4. The parallel processing apparatus according to claim 1, wherein the control circuit finds the second parallelism, based on a product of a ratio of the measurement value of the operation time for the operations for the first portion to the estimated operation time and the first parallelism.

5. The parallel processing apparatus according to claim 1, wherein the plurality of operational circuits are a plurality of logic operation circuits.

6. The parallel processing apparatus according to claim 1, wherein the plurality of operational circuits are a plurality of processors.

7. A parallel processing method for parallel processing apparatus including a plurality of operational circuits that execute operations for data in parallel and a control circuit, the method comprising:
   executing a first processing upon an end of operations for a first portion of the data, the data including at least a first portion and a second portion, the second portion of the data being an object of operations subsequent to the first portion of the data, the first processing being configured to:
      obtain, by the control circuit, estimated operation time for operations for the second portion of the data based on target time for operational processing for the data and a data amount of remaining data for which no operation has been executed in the data;
      determine, by the control circuit, a second parallelism degree of the operations for the second portion of the data, based on a first parallelism degree of the operations for the first portion of the data, a measurement value of operation time for the operations for the first portion of the data, and the estimated operation time, the second portion of the data is a portion for which no operation has been executed; and
      cause, by the control circuit, operational circuits, numbering in a number indicated by the second parallelism among the plurality of operational circuits, to execute the operations for the second portion,
   the control circuit calculates a difference between predicted processing time for the operational processing for the first portion and actual processing time for the operational processing for the first portion, based on a measurement value of operation time for operations for a third portion that is an object of operations precedent to the first portion, a third parallelism of the operations for the third portion, the measurement value of the operation time for the operations for the first portion, and the first parallelism, and, when the difference exceeds a first threshold, decreases a data amount of the second portion below a data amount of the first portion.

8. The parallel processing method according to claim 7, comprising:
   determining, by the control circuit, the estimated operation time, so that processing time for the operational processing for the data is equal to or shorter than the target time and a first difference between the processing time and the target time is smaller than a threshold; and
   repeating, by the control circuit, control in which the operational circuits numbering in the number indicated by the second parallelism are made to execute the operations for the second portion, with each of a plurality of portions of the data regarded as the first portion, until operations for a last portion are ended.

9. The parallel processing method according to claim 8, comprising increasing, by the control circuit, the data amount of the second portion more than the data amount of the first portion, when the second difference is below a second threshold that is below the first threshold.

10. A non-transitory computer-readable recording medium having stored a program that causes a parallel processing apparatus including a control circuit and a plurality of operational circuits to execute a process, the process comprising:
   executing a first processing upon an end of operations for a first portion of the data, the data including at least a first portion and a second portion, the second portion of the data being an object of operations subsequent to the first portion of the data, the first processing being configured to:
      obtain estimated operation time for operations for the second portion of the data based on target time for operational processing for the data and a data amount of remaining data for which no operation has been executed in the data;
      determine, a second parallelism degree of the operations for the second portion of the data, based on a first parallelism degree of the operations for the first portion of the data, a measurement value of operation time for the operations for the first portion of the data, and the estimated operation time, the second portion of the data is a portion for which no operation has been executed; and
      cause operational circuits, numbering in a number indicated by the second parallelism among the plurality of operational circuits, to execute the operations for the second portion,
   the control circuit calculates a difference between predicted processing time for the operational processing for the first portion and actual processing time for the operational processing for the first portion, based on a measurement value of operation time for operations for a third portion that is an object of operations precedent to the first portion, a third parallelism of the operations for the third portion, the measurement value of the operation time for the operations for the first portion, and the first parallelism, and, when the difference exceeds a first threshold, decreases a data amount of the second portion below a data amount of the first portion.

11. The non-transitory computer-readable recording medium according to claim 10, comprising:
- determining, by the control circuit, the estimated operation time, so that processing time for the operational processing for the data is equal to or shorter than the target time and a difference between the processing time and the target time is smaller than a threshold; and
- repeating, by the control circuit, control in which the operational circuits numbering in the number indicated by the second parallelism are made to execute the operations for the second portion, with each of a plurality of portions of the data regarded as the first portion, until operations for a last portion are ended.

12. The non-transitory computer-readable recording medium according to claim 10, comprising when the difference is below a second threshold that is below the first threshold, increasing the data amount of the second portion more than the data amount of the first portion.

* * * * *